(12) United States Patent
Sarkar et al.

(10) Patent No.: US 8,709,965 B2
(45) Date of Patent: Apr. 29, 2014

(54) PROCESS FOR PREVENTING POLYMERIZATION OF CRACKED VOLATILE PRODUCTS DURING PYROLYSIS AND GASIFICATION

(75) Inventors: Manoj Kumar Sarkar, Hyderabad (IN); Banibrata Pandey, Hyderabad (IN); Malaiyandi Vasanthi, Hyderabad (IN); Koruprolu Venkata Rao, Hyderabad (IN); Petichimuthu Sakthipriya, Hyderabad (IN)

(73) Assignee: Nagarjuna Energy Private Limited, Nagarjuna Hills, Punjagutta, Hyderabad (IN)

( * ) Notice: Subject to any disclaimer, the term of this patent is extended or adjusted under 35 U.S.C. 154(b) by 614 days.

(21) Appl. No.: 12/671,655

(22) PCT Filed: Jul. 31, 2008

(86) PCT No.: PCT/IB2008/001980
§ 371 (c)(1),
(2), (4) Date: Jun. 22, 2011

(87) PCT Pub. No.: WO2009/016473
PCT Pub. Date: Feb. 5, 2009

(65) Prior Publication Data
US 2011/0240923 A1  Oct. 6, 2011

(30) Foreign Application Priority Data
Aug. 1, 2007 (IN) .............................. 223/CHE/2007

(51) Int. Cl.
*B01J 21/18* (2006.01)
*C01B 3/02* (2006.01)
*C01B 3/32* (2006.01)
*C01B 3/36* (2006.01)
*C01B 3/40* (2006.01)

(52) U.S. Cl.
USPC ........... 502/182; 48/197 R; 502/183; 502/185

(58) Field of Classification Search
USPC .................. 502/180, 182, 183, 185; 252/373; 48/197 R
See application file for complete search history.

(56) References Cited

U.S. PATENT DOCUMENTS

| | | | | |
|---|---|---|---|---|
| 2,799,708 A | * | 7/1957 | Oakley et al. ................. | 568/384 |
| 4,052,336 A | * | 10/1977 | van Montfoort et al. ...... | 502/185 |
| 4,592,762 A | * | 6/1986 | Babu et al. ................. | 48/197 R |
| 4,699,632 A | * | 10/1987 | Babu et al. ................. | 48/197 R |
| 4,950,309 A | * | 8/1990 | Schulz ....................... | 48/197 R |
| 5,019,135 A | * | 5/1991 | Sealock et al. ............. | 48/197 R |
| 5,192,735 A | * | 3/1993 | Pagotto et al. ............. | 502/417 |
| 5,998,328 A | * | 12/1999 | Dawes et al. ............... | 502/182 |
| 6,596,664 B2 | * | 7/2003 | Kittrell et al. ............... | 502/182 |
| 2002/0194782 A1 | * | 12/2002 | Paisley ..................... | 48/197 FM |
| 2008/0149896 A1 | * | 6/2008 | Lenglet ........................ | 252/373 |
| 2010/0051874 A1 | * | 3/2010 | O'Connor et al. ........... | 252/373 |
| 2010/0299990 A1 | * | 12/2010 | Aradi et al. .................... | 44/307 |

* cited by examiner

*Primary Examiner* — Wayne Langel
(74) *Attorney, Agent, or Firm* — Colin P. Cahoon; Celina M. Orr; Carstens & Cahoon, LLP

(57) ABSTRACT

The present invention is directed towards a process of preparing a catalyzed carbonaceous material and preventing polymerization of cracked volatile products during pyrolysis or gasification of carbonaceous materials.

5 Claims, No Drawings

PROCESS FOR PREVENTING POLYMERIZATION OF CRACKED VOLATILE PRODUCTS DURING PYROLYSIS AND GASIFICATION

FIELD OF THE INVENTION

The present invention is in the field of gasification technology.

BACKGROUND OF THE INVENTION

Biomass gasification is a complex thermo chemical process that consists of a number of elementary chemical reactions, beginning with the partial oxidation of a lignocellulosic fuel with a gasifying agent, usually air, oxygen or steam.

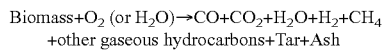

$$\text{Biomass} + O_2 \text{ (or } H_2O) \rightarrow CO + CO_2 + H_2O + H_2 + CH_4$$
$$+ \text{other gaseous hydrocarbons} + \text{Tar} + \text{Ash}$$

In a gasification process, carbonaceous material undergoes various chemical reactions at various temperature ranges, i.e. from ambient to 1000° C. The nature of reactions is given below:

At 400-600° C.: The carbonaceous material decomposes into char and volatile matter.
At 600-1000: Carbon reacts with oxygen to produce carbon dioxide and heat and subsequently the $CO_2$ thus produced reacts with C (char) to produce CO.
At 1000° C.: The steam is used to regulate the temperature and the steam used reacts with carbon to produce carbon mono-oxide and hydrogen.

The tar is formed at 400-600° C., wherein the volatile matter undergoes secondary decomposition and polymerization to produce tar. Tars are problematic in integrated biomass gasification systems for a number of reasons. Tars can condense in exit pipes and on particulate filters leading to blockages and clogged filters and other complications. As mentioned previously, existing process of gasification utilizes very complex and expensive purification system to overcome the tar problem.

Several technology such as mechanism methods (scrubbers, filters, cyclone, ESP and RSP), self-modification methods (selecting better gasifier and optimizing operation parameters) and newly developed plasma technology have been tested with certain degree of success.

Mechanism methods only remove or capture the tar from product gases, while the energy in tar is lost. The self-modification can reduce the tar and convert the tar into useful gases; however, modification of operation parameter is at the expense of reduction in the heat value of gases. A new two-stage gasifier can produce the syngas with low tar content and high heat value.

Thermal cracking and catalytic cracking are used to decompose or reduce tar though there are still some disadvantages. In order to gets highly efficient tar decomposition, the temperature of thermal cracking needs to be very high, which can result in higher operating cost. Catalyst cracking can modify the composition of product gases at very low temperature.

For catalyst cracking shortcomings exists such as the commercial Ni-based and alkali metal catalysts will be inactive by deposited carbon and $H_2S$, as for dolomite catalyst, broken particles also decreases the activity. Plasma technology cannot only effectively remove fly ash, $NO_x$ and $SO_2$, but also sharply decreases the formation of tar during biomass gasification. A novel catalytic deposition (intimate contact between biomass and the catalyst) inside the biomass can overcome the disadvantages.

US patent 20070000177A1 describes the process of low temperature catalytic gasification of carbonaceous material achieves high carbon conversion to methane at mild temperature for fuel application.

U.S. Pat. No. 7,132,183 describes gasification process of carbonaceous feed stock in a gasifier with high temperature operating in the range of 700°-1600° C. and a portion of gases produced there from electrochemically oxidized in a fuel cell.

WO20070044342 patent describes the function of catalytic function of reforming a tar contained in the gas produced by the gasification reaction which absorbs $CO_2$ contained in a gas by a chemical to acceleration due to thermal transfer of flowable heat carrier and a chemical.

WO2006031011 provides a gasification technique includes first stage fluidized bed catalytic gasification and second stage gasification of tar and catalytic reforming to convert nitrogen in tar and HCN in a flammable gas into $NH_3$. The temperature of a total process is lower than the melting point of ash; powdery ash is generated and thus easily treated.

There have been extensive researches for evolving a tar free gasification process for conversion of coal or biomass into synthesis gas. The crux of tar generation process lies in reaction mechanisms involved leading to tar formation.

Till date all technologies involve tar elimination by removing the tar outside the gasifier after the gas is produced. However, no technology is available to prevent tar formation at pyrolysis step during gasification.

OBJECT OF THE INVENTION

The object of the invention is to prevent polymerization of cracked volatile products during pyrolysis and gasification process, thereby preventing tar formation during said process.

DETAILED DESCRIPTION OF THE PRESENT INVENTION

Accordingly, the present invention is directed towards a process preparing a carbonaceous material which can be used as staring material for either pyrolysis and/or gasification, by which tar formation can be eliminated.

In one aspect of the present invention, the invention discloses a process of preparing a catalyzed carbonaceous material, said process comprising the steps:
(a) soaking a carbonaceous material in a soluble metal salt solution,
(b) drying the carbonaceous material of step (a),
(c) raising the temperature of the carbonaceous material to a temperature sufficient to decompose the metal salt to its oxide and/or carbonates to obtain a catalyzed carbonaceous material.
wherein the soluble salt is capable of decomposing into oxide and/or carbonates at a temperature which is below the decomposing temperature of the carbonaceous materials.

In another aspect the carbonaceous material is lignocellulosic biomass.

Yet in another aspect the metal salt is selected from a group comprising nickel, cobalt, iron and zinc.

In the present process the soluble salt used is nickel ammonium carbonate.

One more aspect of the present process the concentration of metal salt is in the range of 0.05% to 2%.

The decomposition temperature of the soluble salt is in the range of 150° C. to 300° C.

In another embodiment of the present invention, the invention discloses a process of preventing polymerization of cracked volatile products during pyrolysis or gasification of carbonaceous materials, said process comprising pyrolyzing and/or gasifying catalyzed carbonaceous material as obtained by the process as disclosed in the first embodiment of the invention.

In the present invention, the packed bed reactor is used in updraft mode, in which the reactive gases and nitrogen is passed at the bottom and the product gases released at the top. The pyrolytic gasification process of the catalyzed biomass is conducted with normal reforming reactants oxygen, carbon dioxide and steam, singly or in combination along with nitrogen.

EXAMPLES

Example 1

Pyrolytic gasification of raw biomass at various temperatures.

The packed bed empty reactor was preheated 40-50° C. above the reacting temperature. Once the temperature is attained, the reactor was then loaded with 10 g of raw sweet sorghum bagasse pellets. The reaction was carried out at a temperature of 450, 500, 550, 600 and 650° C. (reacting temperature). The reactions were carried out in presence of combination of different gases wherein the flow rates of carbon dioxide at 10 L/hr, oxygen at 20% of carbon dioxide flow rate, steam at 100 ml/hr and nitrogen was kept at 10 L/hr. The decomposed liquid products in vapor form from the reactor were collected in the iso-propanol medium which was used for tar and liquid products estimations. After completion of the reaction the reactor was cooled down and char was quantified. The results are given in table 1.

Table 1 gives the result of tar, char and liquid product formation at different temperatures

TABLE 1

| Temperature ° C. | Reactants | Char % | Liquid products % | Tar % |
|---|---|---|---|---|
| 450 | $CO_2 + O_2 +$ | 35.96 | 18.98 | 14.34 |
| 500 | steam along | 32.24 | 13.76 | 13.24 |
| 550 | with $N_2$ | 30.42 | 12.08 | 12.88 |
| 600 | | 28.02 | 11.616 | 12.484 |
| 650 | | 23.84 | 8.78 | 10.882 |

Example 2

Effect of 0.1% Nickel Catalyst on Tar Removal

The packed bed empty reactor was preheated 40-50° C. above the reacting temperature. Once the temperature is attained, the reactor was then loaded with 10 g of catalyzed sweet sorghum bagasse pellets. The reaction was carried out at a temperature of 450, 500, 550, 600 and 650° C. (reacting temperature). The reactions were carried out in presence of combination of different gases wherein the flow rates of carbon dioxide at 10 L/hr, oxygen at 20% of carbon dioxide flow rate, steam at 100 ml/hr and nitrogen was kept at 10 L/hr. The decomposed liquid products in vapor form from the reactor were collected in the iso-propanol medium which was used for tar and liquid products estimations by the following procedures. After completion of the reaction the reactor was cooled down and char was quantified.

The liquid collected in iso-propanol was steam distilled to remove both iso-propanol and other volatile organic compounds. Tar was assumed to be non-volatile and remained in the residual water. The tar was extracted using benzene and was quantified after vaporizing the benzene and weighing the residual matter as tar.

The results are given in table 2.

Table 2 gives the result of tar, char and liquid product formation at different temperatures

TABLE 2

| Temperature ° C. | Reactants | Char % | Liquid products % | Tar % |
|---|---|---|---|---|
| 450 | $CO_2 + O_2 +$ | 29 | 3.11 | 2.2 |
| 500 | steam along | 25 | 2.89 | 2.12 |
| 550 | with $N_2$ | 24 | 2.58 | 1.7 |
| 600 | | 21 | 2.43 | 1.2 |
| 650 | | 19 | 2.1 | 0.7 |

Example 3

Effect of 0.25% Nickel Catalyst on Tar Removal

The packed bed empty reactor was preheated 40-50° C. above the reacting temperature. Once the temperature is attained, the reactor was then loaded with 10 g of catalyzed sweet sorghum bagasse pellets. The reaction was carried out at a temperature of 450, 500, 550, 600 and 650° C. (reacting temperature). The reactions were carried out in presence of combination of different gases wherein the flow rates of carbon dioxide at 10 L/hr, oxygen at 20% of carbon dioxide flow rate, steam at 100 ml/hr and nitrogen was kept at 10 L/hr. The decomposed liquid products in vapor form from the reactor were collected in the iso-propanol medium which was used for tar and liquid products estimations. After completion of the reaction the reactor was cooled down and char was quantified. The results are given in Table 3.

Table 3 gives the result of tar, char and liquid product formation at different temperatures

TABLE 3

| Temperature ° C. | Reactants | Char % | Liquid products % | Tar % |
|---|---|---|---|---|
| 450 | $CO_2 + O_2 +$ | 22.21 | 4.63 | 1.88 |
| 500 | steam along | 22.18 | 5.18 | 1.8 |
| 550 | with $N_2$ | 21.54 | 5.4 | 1.54 |
| 600 | | 18.85 | 3.88 | 0.508 |
| 650 | | 17.78 | 3.19 | 0.502 |

Example 4

Effect of 0.5% Nickel Catalyst on Tar Removal

The packed bed empty reactor was preheated 40-50° C. above the reacting temperature. Once the temperature is attained, the reactor was then loaded with 10 g of catalyzed sweet sorghum bagasse pellets. The reaction was carried out at a temperature of 450, 500, 550, 600 and 650° C. (reacting temperature). The reactions were carried out in presence of combination of different gases wherein the flow rates of carbon dioxide at 10 L/hr, oxygen at 20% of carbon dioxide flow rate, steam at 100 ml/hr and nitrogen was kept at 10 L/hr. The decomposed liquid products in vapor form from the reactor were collected in the iso-propanol medium which was used for tar and liquid products estimations. After completion of the reaction the reactor was cooled down and char was quantified. The results are given in Table 4.

Table 4 gives the result of tar, char and liquid product formation at different temperatures

TABLE 4

| Temperature ° C. | Reactants | Char % | Liquid products % | Tar % |
|---|---|---|---|---|
| 450 | $CO_2 + O_2 +$ | 29.56 | 3.025 | 2.1 |
| 500 | steam along | 30.32 | 3.18 | 0.63 |
| 550 | with $N_2$ | 25.65 | 2.9 | 0.54 |
| 600 | | 23.23 | 2.53 | 0.53 |
| 650 | | 21.02 | 2.06 | 0.50 |

Example 5

Analysis of Liquid Products from the Pyrolytic Gasification at 650° C.

The organic liquid layer of the steam distilled liquid was analyzed using GC-MS.

The analysis showed that the liquid contains the components such as aliphatic alcohols, aldehydes, acids, phenol, phenol and benzene derivatives, toluene, furfurals and aldose. This indicates that the liquid contain no tar.

| 1. Operating parameters for GC-MS: | |
|---|---|
| Model: | 5975, Aglient make |
| Carrier gas: | Helium |
| Flow rate: | 0.8 ml/min |
| Injector temp: | 220° C. |
| Column: | HP-5 MS 5% phenyl methyl siloxane (capillary) |
| Oven temp: | Ramp: 40° C. for 5 min, 8° C./min; final temp 250° C. hold for 5 min |
| Electron gun: | Tungsten filament. |
| Ion source : | Electron impact ionization |
| Mass analyzer: | Quadrupole mass analyzer |
| MS quadrapole temp: | 150° C. |
| Detector: | Electron multiplier tube. |

Example 6

Analysis of Gas Composition from the Pyrolytic Gasification at 650° C.

The gas from the reactor was analyzed in a Nucon gas analyzer. Measurements on volumetric concentration of $H_2$, $CO_2$, $CH_4$, and CO can be done.

Table 5 gives the result of gas composition at 650° C. pyrolytic gasification.

| Gas composition | % |
|---|---|
| CO | 22.9 |
| $CO_2$ | 21.4 |
| $H_2$ | 15 |
| $CH_4$ | 6.5 |

We claim:

1. A process of preparing a catalyzed carbonaceous material, said process comprising the steps:
    (a) soaking a carbonaceous material in a soluble metal salt solution,
    (b) drying the carbonaceous material of step (a),
    (c) raising the temperature of the carbonaceous material to a temperature sufficient to decompose the metal salt to its oxide and/or carbonates to obtain a catalyzed carbonaceous material,
    wherein the soluble salt is capable of decomposing into oxide and/or carbonates at a temperature which is below the decomposing temperature of the carbonaceous materials, and wherein the carbonaceous material is a lignocellulosic biomass.

2. A process as claimed in claim 1, wherein the metal salt is selected from the group consisting of nickel, cobalt, iron and zinc.

3. A process as claimed in claim 1, wherein the soluble salt is nickel ammonium carbonate.

4. A process as claimed in claim 1, wherein the concentration of metal salt is in the range of 0.05% to 2%.

5. A process as claimed in claim 1, wherein the decomposition temperature of the soluble salt is in the range of 150° C. to 300° C.

* * * * *